United States Patent [19]

Wille

[11] Patent Number: 4,836,127
[45] Date of Patent: Jun. 6, 1989

[54] ROD HOLDER ADAPTOR FOR BOAT

[76] Inventor: Mark E. Wille, 133 Saeger Ave., Oconomowoc, Wis. 53066

[21] Appl. No.: 207,286

[22] Filed: Jun. 15, 1988

[51] Int. Cl.⁴ .............................................. B63B 35/00
[52] U.S. Cl. ..................... 114/343; 43/21.2; 248/231.1; 248/231.3; 248/231.9; 248/538; 463/197; 463/349
[58] Field of Search ............... 403/194, 196, 197, 349; 248/231.1, 231.3, 231.9, 538, 540; 114/343, 364, 255; 108/29, 44, 150; 43/21.2

[56] References Cited

U.S. PATENT DOCUMENTS

| 3,964,706 | 6/1976 | Adams | 43/21.2 |
| 4,062,299 | 12/1977 | Smith | 114/364 |
| 4,485,579 | 12/1984 | Hawie | 43/21.2 |

Primary Examiner—Joseph F. Peters, Jr.
Assistant Examiner—Edwin L. Swinehart
Attorney, Agent, or Firm—Fuller, Puerner & Hohenfeldt

[57] ABSTRACT

An adaptor for a fishing rod holder for mounting a down rigger includes a mounting post with an accessory platform and a layered sleeve and lock nut.

2 Claims, 1 Drawing Sheet

ROD HOLDER ADAPTOR FOR BOAT

BACKGROUND OF THE INVENTION

The invention relates to an adaptor which is received in an angled sleeve or socket on the side of a boat hull which is used to support fishing rods for trolling. There is a need for mounting equipment to easily support down riggers supported on a boat hull. An easy, convenient mounting means is desirable to avoid fastening extra mounting brackets to the boat hull.

SUMMARY OF THE INVENTION

The invention provides an adaptor device which is readily received and locked in the mounting sleeve or socket for a trolling rod which is typically inserted in the boat hull at an angle. The rod holders are conventionally provided with cross pins which provide a floor or base for the fishing rod. This cross pin is used as part of a bayonet connection with the slotted ends in the fishing rod. A tapered sleeve loosely fitted on a mounting post is pressed into the upper end of the rod holer sleeve by a lock nut which draws the cross pin of the rod holer firmly into engagement in the slotted end of the post. A mounting bracket on the upper end of the post is angled to provide a generally horizontal platform for mounting accessories.

Further objects, advantages and features of the invention will become apparent from the disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
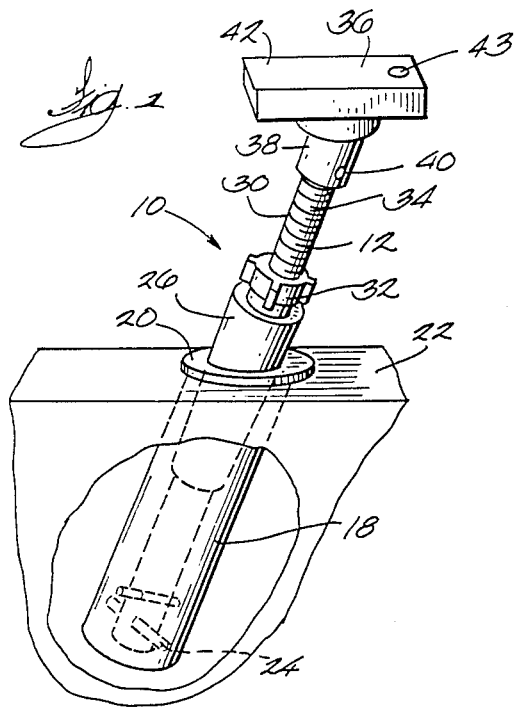
FIG. 1 is a perspective view of the rod holder adaptor of the invention.

In the drawings FIG. 1 shows a rod holder adaptor 10 which includes a mounting post 12 which is provided with a bayonet slot connection 14 at the lower end 16. The mounting post is shown in a conventional rod holder sleeve 18 which has an upper flange 20 which supports the rod holder in the boat hull 22. The rod holder is conventionally provided with a gimbal pin 24 which forms a flooring or stop in the sleeve to position a fishing rod for trolling.

In accordance with the invention, means are provided for detachably locking said post in the rod holder sleeve. In a disclosed construction the means includes a tapered sleeve 26 which snugly interfits in the inside 28 of the sleeve 18. The means also includes a threaded portion 30 on the post and a plastic lock nut 32 which is sized for convenient manual manipulation.

Figure 2:
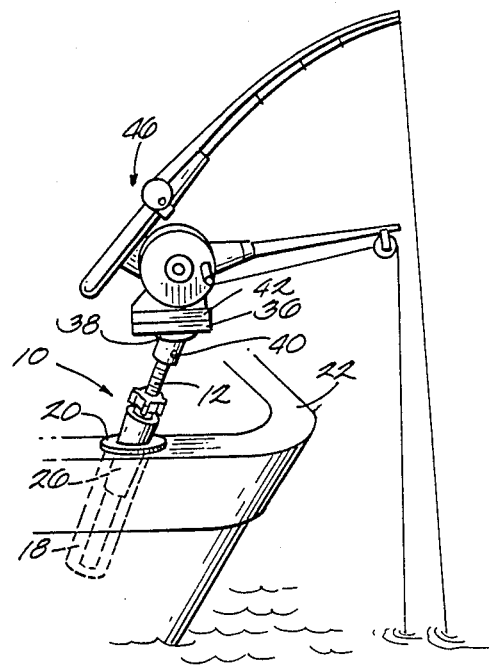
FIG. 2 is a similar view of the rod holer of FIG. 1 on a reduced scale.
Figure 3:
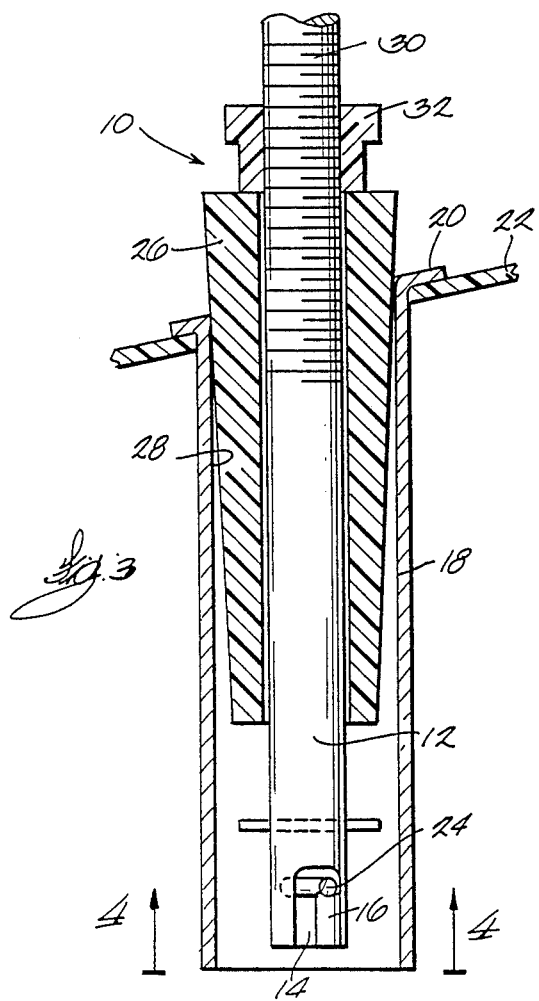
FIG. 3 is an enlarged sectional view of the rod holder adaptor shown in FIG. 1.
Figure 4:
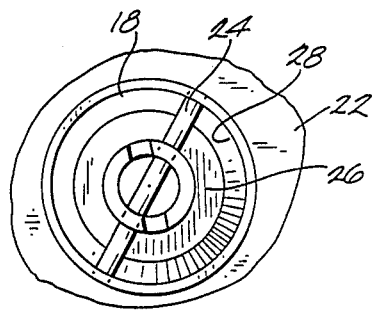
FIG. 4 is a bottom view along line 4—4 of FIG. 3.

The upper end 34 is provided with a mounting platform 36 which includes an internally threaded sleeve portion 38 and can be provided with a locking screw 40. The mounting platform 42 is arranged at an angle with respect to the post so as to provide a generally horizontal mounting surface for connection to various fishing accessories. In FIG. 2 a downrigger fishing reel and rod combination 46 is shown mounted to the mounting platform 42. Suitable apertures 43 are provided for mounting purposes. Other types of accessories can be mounted on platform 42 such as cutting boards, filet boards, barbeque grills and video cameras, etc.

In use the adaptor is assembled by inserting the post 12 and sleeve 20 in the socket 18. The slot 14 is registered with the pin 24. The lock nut is then threaded down to press the tapered sleeve into a tight fit in the rod holer.

I claim:

1. In combination a rod holder sleeve and an adapter for mounting platform for supporting marine accessories, comprising a rod holder sleeve having a cross pin forming a stop in said rod holer sleeve, an adapter mounting post having a slot for connection to said cross pin in said rod holer sleeve, a tapered sleeve on said post, locking means on said post loosely fitted for pressing said tapered sleeve into a press fit in said rod holder sleeve to maintain the pin in engagement with said slot.

2. The combination of claim 1 wherein a platform is mounted at an angle with respect to said post to provide a generally horizontal mounting surface.

* * * * *